US006853618B1

United States Patent
Held et al.

(10) Patent No.: US 6,853,618 B1
(45) Date of Patent: Feb. 8, 2005

(54) UPC FAIL DOWN

(75) Inventors: Mark Held, Pittsburgh, PA (US);
Srinivas R. Goli, Allison Park, PA (US)

(73) Assignee: Marconi Communications, Inc., Warrendale, PA (US)

( * ) Notice: Subject to any disclaimer, the term of this patent is extended or adjusted under 35 U.S.C. 154(b) by 0 days.

(21) Appl. No.: 09/499,859

(22) Filed: Feb. 7, 2000

(51) Int. Cl.$^7$ .......................... H04L 12/28; H04L 12/56
(52) U.S. Cl. ................. 370/230; 370/252; 370/395.21; 370/395.43
(58) Field of Search .............................. 370/230, 230.1, 370/235, 252, 389, 395.1, 395.2, 395.21, 395.4, 395.42, 395.43, 395.7, 465, 229, 236, 235.1, 236.2, 253

(56) References Cited

U.S. PATENT DOCUMENTS

| 5,289,462 | A | * | 2/1994 | Ahmadi et al. | 370/232 |
|---|---|---|---|---|---|
| 5,446,730 | A | * | 8/1995 | Lee et al. | 370/351 |
| 5,504,744 | A | * | 4/1996 | Adams et al. | 370/232 |
| 5,530,695 | A | * | 6/1996 | Dighe et al. | 370/232 |
| 5,644,715 | A | * | 7/1997 | Baugher | 709/228 |
| 5,793,747 | A | * | 8/1998 | Kline | 370/230 |
| 5,898,668 | A | * | 4/1999 | Shaffer | 370/230 |
| 5,943,321 | A | * | 8/1999 | St-Hilaire et al. | 370/259 |
| 6,154,778 | A | * | 11/2000 | Koistinen et al. | 709/228 |
| 6,167,050 | A | * | 12/2000 | Chung | 370/235.1 |
| 6,304,551 | B1 | * | 10/2001 | Ramamurthy et al. | 370/232 |
| 6,314,085 | B1 | * | 11/2001 | Saranka | 370/230 |
| 6,411,617 | B1 | * | 6/2002 | Kilkki et al. | 370/353 |
| 6,442,132 | B1 | * | 8/2002 | Burns et al. | 370/218 |
| 6,611,522 | B1 | * | 8/2003 | Zheng et al. | 370/395.21 |
| 6,628,614 | B2 | * | 9/2003 | Okuyama et al. | 370/230.1 |

* cited by examiner

*Primary Examiner*—Alpus H. Hsu
(74) *Attorney, Agent, or Firm*—Ansel M. Schwartz

(57) ABSTRACT

An apparatus for establishing circuits in an ATM network. The apparatus includes a controller which attempts to establish a circuit according to original quality of service requirements of a UPC associated with the circuit, which determines available resources of the ATM network and which automatically relaxes the original quality of service requirements associated with a circuit for the circuit to be formed in the ATM network with the available resources of the ATM network. The apparatus includes a memory which stores a plurality of different quality of service requirements. The memory is connected to the controller for the controller to obtain different quality of service requirements for the controller to automatically relax the original quality of service requirements with different quality of service requirements. A method for establishing circuits in an ATM network.

14 Claims, 1 Drawing Sheet

UPC FAIL DOWN

FIELD OF THE INVENTION

The present invention is related to meeting Quality of Service requirements for circuits when network resources are not available. More specifically, The present invention is related to meeting Quality of Service requirements for circuits when network resources are not available by automatically selectively relaxing the Quality of Service requirements.

BACKGROUND OF THE INVENTION

QoS requirements for an administratively created circuit are stored in an object called a UPC (Usage Parameter Contract). The administratively created circuits that can have associated UPCs are called SPVCs (Soft Permanent Virtual Circuits) or SPVPs (Soft Permanent Virtual Paths).

In an ATM network, requests for circuits can be rejected due to a lack of the network resources needed to meet that circuit's QoS (Quality of Service) requirements. In the normal case when such a circuit is not successfully established, the failure is usually communicated to the user and the network administrator in some fashion. One option at that point would be to relax the QoS requirements in a way that allows the circuit to be established within the framework of the existing resources. That option currently requires operator intervention. This invention is a method whereby through configuration options and software, the switch will attempt to create the rejected circuit by selectively relaxing the QoS requirements of the call automatically without the need for operator intervention.

SUMMARY OF THE INVENTION

The present invention pertains to an apparatus for establishing circuits in an ATM network. The apparatus comprises a controller which attempts to establish a circuit according to original quality of service requirements of a UPC associated with the circuit, which determines available resources of the ATM network and which automatically relaxes the original quality of service requirements associated with a circuit for the circuit to be formed in the ATM network with the available resources of the ATM network. The apparatus comprises a memory which stores a plurality of different quality of service requirements. The memory is connected to the controller for the controller to obtain different quality of service requirements for the controller to automatically relax the original quality of service requirements with different quality of service requirements.

The present invention pertains to a method for establishing circuits in an ATM network. The method comprises the steps of attempting to form a connection in an ATM network satisfying original quality of service requirements. Then there is the step of rejecting the formation of the circuit due to resources of the ATM network not being available to meet the original quality of service requirements of the circuit. Next there is the step of relaxing automatically the quality of service requirements of the circuit. Then there is the step of creating the circuit in the ATM network subject to the relaxed quality of service requirements.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
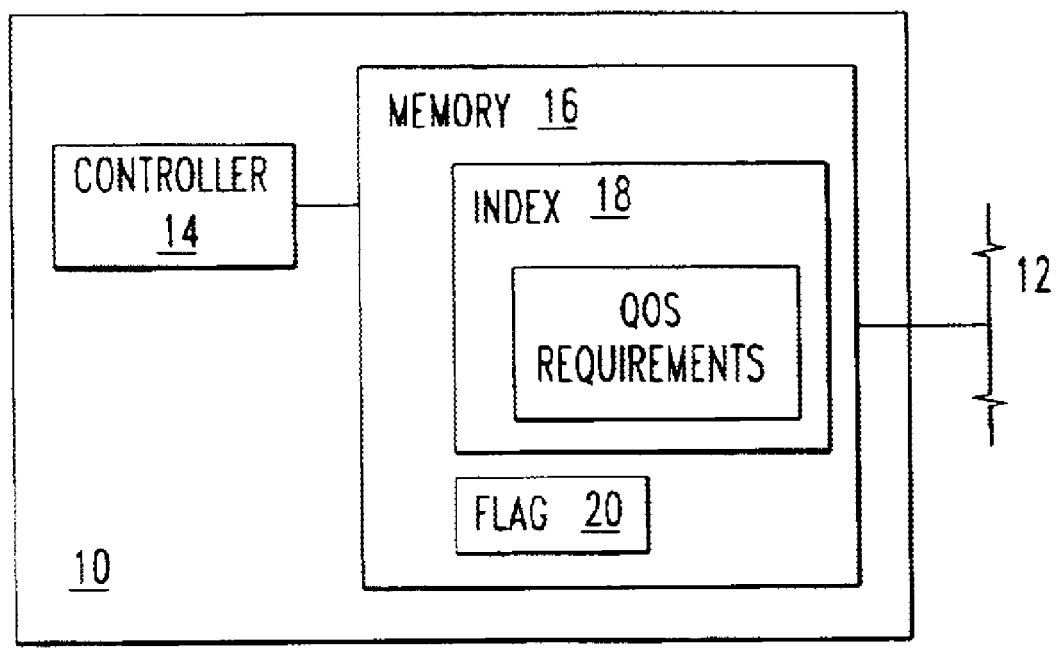
FIG. 1 is a schematic representation of an apparatus of the present invention.

Referring now to the drawings wherein like reference numerals refer to similar or identical parts throughout the several views, and more specifically to figure thereof, there is shown an apparatus 10 for establishing circuits in an ATM network 12. The apparatus 10 comprises a controller 14 which attempts to establish a circuit-according to original quality of service requirements of a UPC associated with the circuit, which determines available resources of the ATM network 12 and which automatically relaxes the original quality of service requirements associated with a circuit for the circuit to be formed in the ATM network 12 with the available resources of the ATM network 12. The apparatus 10 comprises a memory 16 which stores a plurality of different quality of service requirements. The memory 16 is connected to the controller 14 for the controller 14 to obtain different quality of service requirements for the controller 14 to automatically relax the original quality of service requirements with different quality of service requirements.

Preferably, the controller 14 automatically selectively relaxes the quality of service requirements by choosing a different quality of service requirement. The memory 16 preferably includes an index 18 having the different quality of service requirements ordered in terms of priority for the controller 14 to choose when the controller 14 relaxes the original quality of service requirements and attempts to establish the circuit. Preferably, the controller 14 places a flag 20 in the memory 16 for the circuit when the circuit is established with relaxed quality of service requirements.

The controller 14 periodically preferably reexamines the ATM network 12 resources and attempts to establish the circuit with the original quality of service requirements in the ATM network 12. Preferably, when the controller 14 attempts to establish the circuit with the original quality of service requirements, if the original quality of service requirements of the circuit cannot be satisfied, the controller 14 attempts to establish the circuit with the quality of service requirements in the index 18 according to their priority until quality of service requirements with a higher priority than the quality of service requirement that the circuit is currently established under in the network 12 is found. The circuit is preferably an SPVx circuit.

The present invention pertains to a method for establishing circuits in an ATM network 12. The method comprises the steps of attempting to form a connection in an ATM network 12 satisfying original quality of service requirements. Then there is the step of rejecting the formation of the circuit due to resources of the ATM network 12 not being available to meet the original quality of service requirements of the circuit. Next there is the step of relaxing automatically the quality of service requirements of the circuit. Then there is the step of creating the circuit in the ATM network 12 subject to the relaxed quality of service requirements.

Preferably, the relaxing step includes the step of relaxing automatically and selectively the original quality of service requirements by choosing different quality of service requirements than the original quality of service requirements. The relaxing automatically and selectively step preferably includes the step of choosing the different quality of service requirements by a controller 14 from an index 18 having a plurality of different quality of service requirements stored in a memory 16 connected to the controller 14.

Preferably, before the attempting step, there is the step of placing the different quality of service requirements in the index 18, each with a priority relative to each other and the original quality of service requirements. After the recreating step, there is preferably the step of placing a flag 20 in the memory 16 by the controller 14 corresponding with the circuit that is established with relaxed quality of service requirements.

Preferably, after the creating step, there are the steps of re-examining the ATM network 12 resources and attempting to establish the circuit with the original quality of service requirements in the ATM network 12. After the attempting to establish step, there is preferably the step of attempting to establish the circuit with the different quality of service requirements in the index 18 according to their priority until different quality of service requirements with a higher priority than the quality of service requirements that the circuit is currently established under in the network 12 is found.

In the operation of the preferred embodiment, for every relevant QoS parameter for which there is an entry in a UPC, the software allows the user to specify which parameters can be changed, in what order, and by how much. So, if a call cannot be routed, the switch can retry with, for example, less bandwidth required, or more delay. The current parameters settable in a UPC include the following:

| | |
|---|---|
| [[-servcat] <ServCat>] | Service Category (default: UBR) |
| [ [-pscheme] <pScheme>] | Policing Scheme (default: ubrl) |
| [ [-pcr] <integer>] | PCR (default: "") |
| [ [-scr] <integer>] | SCR (default: "") |
| [ [-mbs] <integer>] | MBS (default: "") |
| [ [-cdvt] <integer>] | CDVT |
| [ [-aal5epd] (yes\|no) ] | AAL5 EPD (default: no) |
| [ [-name] <text>] | Name (default: "") |
| [ [-gcra] (on\|off) ] | GCRA Policing (default: on) |
| [ [-aal5] (yes\|no) ] | AAL5 (default: no) |
| [ [-pktdisc] (on\|off) ] | Packet Discard (default: on) |
| [ [-pppol] (on\|off) ] | PP Policing (default: off) |
| [ [-schdmod] <SchedMode>] | Scheduling Mode (default: default) |
| [ [-altclp] (on\|off) ] | Alt CLP Threshold (default: off) |
| [ [-mcr] <integer>] | ABR MCR (default: "") |
| [ [-aal5cnt] <CountMode>] | AAL5 Counting Mode (default: default) |
| [ [-subcat] <integer>] | Service Sub-category (default: default) |
| [ [-lbmincr] <integer>] | Load Balanced MinCR |
| [ [-lbpcr] <integer>] | Load Balanced PCR |

A controller 14 would unambiguously state the "back-off" order and "back-off" values for each parameter. That set of values could be saved and referred to by an index 18. Then the "back-off" index 18 could be referenced within a UPC. Any SPVX which references a UPC with a "back-off" index 18 configured would behave in the manner described in the event that a route cannot be found using the default UPC parameters.

Finally, if an SPVX is established only after one or more of the, original QoS parameters have been changed, then that SPVX would be tagged as having been "sub-optimally established." This designation is similar to the "sub-optimally routed" designation currently existing for SPVXs. In this case, such "sub-optimally established" SPVXs are periodically re-examined by the switch software to see if a route exists that satisfies the original QoS contract. If it is determined that such a route exists, then the SPVX is re-routed with the original UPC contract parameters.

Tagging occurs by placing a flag 20 in the memory 16 by the controller 14 corresponding with the circuit that is established with relaxed quality of service requirements. When the ATM network 12 resources are reexamined, circuits that have a flag 20 are attempted to be established with their original quality of service requirements in the ATM network 12. The controller 14 has stored the original quality of service requirements of each circuit with a flag in the memory. If the original quality of service requirements for the circuit cannot be met, the controller 14 then attempts to establish the circuit with the different quality of service requirements in the index 18 according to their priority until different quality of service requirements with a higher priority than the quality of service requirements that the circuit is currently established under in the network 12 is found. If none can be found, then the circuit remains established as it is, and the process is repeated again the next time the ATM network 12 resources are reexamined.

The method and apparatus 10 will permit more efficient use of network 12 resources by allowing software to automatically work around failures in a deterministic and selective manner. This can be a feature which can be turned on or off on a per-circuit basis allowing the possibility that this can be a service for which networks can charge users. Network 12 operators will no longer be called on to act in circumstance where the software handles failures.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An apparatus for establishing circuits in an Asynchronous Transfer Mode (ATM) network comprising:

a controller for which a user specifies which requirements can be changed, in what order, and by how much for every quality of service requirement of a Usage Parameter Contract (UPC) of a circuit for which there is an entity in the UPC associated with the circuit which attempts to establish the circuit according to original quality of service requirements of the UPC associated with the circuit, which determines available resources of the ATM network and which automatically relaxes the original quality of service requirements associated with a circuit for the circuit to be formed in the ATM network with the available resources of the ATM network; and a memory which stores a plurality of different quality of service requirements, said memory connected to the controller for the controller to obtain different quality of service requirements for the controller to automatically relax the original quality of service requirements with different quality of service requirements, the memory includes an index having the different quality of service requirements ordered in terms of priority for the controller to choose when the controller relaxes the original quality of service requirements and attempts to establish the circuit.

2. An apparatus as described in claim 1 wherein the requirements of PCR, SCR and MRS can be changed.

3. An apparatus as described in claim 2 wherein the controller automatically selectively relaxes the quality of service requirements by choosing a different quality of service requirement.

4. An apparatus as described in claim 3 wherein the controller places a flag in the memory for the circuit when the circuit is established with relaxed quality of service requirements.

5. An apparatus as described in claim 4 wherein the controller periodically reexamines the ATM network resources and attempts to establish the circuit with the original quality of service requirements in the ATM network.

6. An apparatus as described in claim 5 wherein when the controller attempts to establish the circuit with the original quality of service requirements, if the original quality of service requirements of the circuit cannot be satisfied, the controller attempts to establish the circuit with the quality of service requirements in the index according to their priority until quality of service requirements with a higher priority than the quality of service requirement that the circuit is currently established under in the network is found.

7. An apparatus as described in claim 6 wherein the circuit is an SPVx circuit.

8. A method for establishing circuits in an Asynchronous Transfer Mode (ATM) network comprising the steps of:

specifying by a user which requirements can be changed, in what order, and by how much, for every quality of service requirement of a Usage Parameter Contract (UPC) of a circuit for which there is an entity in the UPC associated with the circuit;

placing the different quality of service requirements in an index, each with a priority relative to each other and the original quality of service requirements;

attempting to form a connection in an ATM network satisfying original quality of service requirements of the UPC associated with the circuits;

rejecting the formation of the circuit due to resources of the ATM network not being available to meet the original quality of service requirements of the circuit;

relaxing automatically the quality of service requirements of the circuit by choosing the different quality of service requirements by a controller from the index having the plurality in terms of different quality of service requirements ordered in terms of priority stored in a memory connected to the controller; and creating the circuit in the ATM network subject to the relaxed quality of service requirements.

9. A method as described in claim 8 wherein the specifying step includes the step of specifying that the requirements of PCR, SCR and MBS can be changed.

10. A method as described in claim 9 wherein the relaxing step includes the step of relaxing automatically and selectively the original quality of service requirements by choosing different quality of service requirements than the original quality of service requirements.

11. A method as described in claim 10 including after the recreating step, there is the step of placing a flag in the memory by the controller corresponding with the circuit that is established with relaxed quality of service requirements.

12. A method as described in claim 11 including after the creating step, there are the steps of re-examining the ATM network resources and attempting to establish the circuit with the original quality of service requirements in the ATM network.

13. A method as described in claim 12 including after the attempting to establish step, there is the step of attempting to establish the circuit with the different quality of service requirements in the index according to their priority until different quality of service requirements with a higher priority than the quality of service requirements that the circuit is currently established under in the network is found.

14. A method as described in claim 13 wherein the attempting step includes the step of attempting to form the connection of an SPVx circuit.

* * * * *